Patented May 7, 1929.

1,711,696

UNITED STATES PATENT OFFICE.

WALTER SCHOELLER AND HERBERT SCHOTTE, OF BERLIN, GERMANY, ASSIGNORS TO THE FIRM CHEMISCHE FABRIK AUF ACTIEN (VORM. E. SCHERING), OF BERLIN, GERMANY.

ESTERS OF AMINO PROPANES.

No Drawing. Application filed March 18, 1925, Serial No. 16,542, and in Germany March 25, 1924.

Our invention refers to new chemical products adapted for pharmaceutical use and to the method of making same. It more particularly relates to the production of esters of amino propanes etherified in $\beta$-position and which correspond to the formula

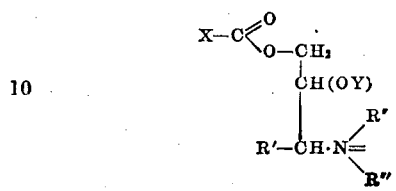

wherein X is either an alkyl or aryl or a product of substitution thereof, Y an alkyl, R' a hydrogen atom or an alkyl or an aryl, R'' a hydrogen atom or an alkyl, R''' a hydrogen atom or an alkyl or R'' and R''' together in certain cases a cyclic radical, and wherein the two remaining affinities of the nitrogen can be satisfied by the addition of an alkyl halide.

The new esters answering this description form colourless or almost colourless salts which are soluble in water and alcohol and are adapted, more especially in the form of salts, for therapeutical use. If heated with alkali, the bases lose their acyl radical.

These esters are produce in two separate stages, viz:
(A) Production of the amino propanes etherified in $\beta$-position
(B) Etherification of these products.

In order to produce the compounds mentioned under (A), we proceed by treating an unsaturated alcohol, for instance allyl alcohol, cinnamic alcohol or isocrotonyl alcohol, in an alcoholic medium, for instance ethyl alcohol or methyl alcohol, with a salt of bivalent mercury, whereby the mercury salt radical and at the same time an oxalkyl is added on the double bond. The ether derivatives containing mercury which are thus obtained are then converted into the corresponding halogen compounds and the halogen is replaced by amines.

The amino compounds thus produced are then converted into esters in a well known manner.

A. In order to produce the amino propanes in $\beta$-position, we prefer proceeding for instance as follows:—

Example 1.

50 grams allyl alcohol are treated at ordinary temperature in a solution of methyl alcohol with 290 grams mercuric acetate. After the lapse of 30 minutes the solvent is removed by evaporation and after diluting with water the residue neutralized with bicarbonate of soda. Upon an aqueous solution of potassium bromide in excess being added, an oil separates out which, on being triturated with some ethyl acetate, crystallizes. After drying in the air, the compound

is boiled in aqueous suspension or better still in a solution of ethyl acetate with one molecule iodine during about 20 minutes, until decolorization ensues, whereupon the mercury salt is removed and the residue is subjected to distillation.

The $\alpha$-hydroxy-$\beta$-methoxy-$\gamma$-iodine-propane which under a pressure of 0.4 mm. boils at about 65–66° C., is heated with an equal quantity by weight of diethyl amine during two hours to 100°. The liquid which on cooling partly solidifies is taken up with an equal quantity of water. On the addition of potassium carbonate the $\alpha$-hydroxy-$\beta$-methoxy-$\gamma$-diethylamino propane

is separated out in the form of an oil which boils under a pressure of 1.2 mm. at about 62–63°, has the strong smell and reaction of a base and readily dissolves in ether.

Example 2.

If the $\alpha$-hydroxy-$\beta$-methoxy-$\gamma$-iodine propane above mentioned is heated during 45 minutes with the double quantity of an alcoholic 33 per cent solution of trimethyl amine, it is converted into the ammonium iodide

which, on the solution being evaporated, remains as a crystalline mass. After recrystallization from alcohol, it forms pointed shining needles arranged in star-fashion, melting about at 108–109° C. (not corrected) and being readily soluble in water.

Example 3.

By proceeding as described with reference to Example 1, using, however, methyl alcohol instead of ethyl alcohol as a solvent, the corresponding ethoxy compounds are obtained.

The α-hydroxy-β-ethoxy-γ-mercuric bromide is a crystalline powder dissolving in water only with difficulty and which can be recrystallized from ethyl acetate. On being treated with iodine in the manner described with reference to Example 1, there results α-hydroxy-β-ethoxy-γ-iodine propane, a colourless oil decomposable by contact with the air and by light, insoluble in water, dissolving readily in alcohol and ether and boiling under a pressure of 1.2 mm. at about 78–80° C. By heating equal quantities of this iodine compound and di-ethyl amine to 100° during two hours, the iodine is replaced by the amine radical. The α-hydroxy-β-ethoxy-γ-diethyl amino propane thus obtained is a colourless liquid boiling under 12 mm. pressure at 100–101° C., having decided basic properties and being soluble in water and ether.

Example 4.

If 3 grams of the iodine hydrine described with reference to Example 1 are heated during 2 to 3 hours at 100° with a solution of ammonia in methyl alcohol saturated at 0° C., there results the α-hydroxy-β-methoxy-γ-amino propane which forms a thick oil boiling under 10 mm. pressure at 104–105° C.

Example 5.

5 grams of the iodine hydrines mentioned with reference to Examples 1 and 3 are heated during 5 hours with 7 grams of an aqueous 33 per cent solution of methyl amine. The compounds obtained

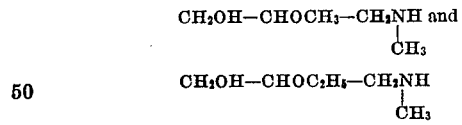

are oils readily soluble in water, ether and alcohol. The compound mentioned in the first place boils under 12 mm. pressure at about 75°, the other compound under 13 mm. pressure at about 89–91°. The picric acid salt of this latter compound, if recrystallized from alcohol, melts at about 92–93° C.

Example 6.

10 grams of the iodine hydrine described with reference to Example 1 are heated during 45 minutes in a water-bath with 10 grams piperidine. After treating the mixture as usual, there is obtained the compound

which forms a colourless oil boiling under 0.3 mm. pressure at about 81–82°. It is readily soluble in water, ether and alcohol and shows a vigorous basic reaction.

Example 7.

To a solution of 4 grams cinnamic alcohol in 30 ccms. methyl alcohol is added a solution of 9 grams mercuric acetate in 60 ccms. methyl alcohol. After the lapse of 10 minutes, no mercury can be found with the aid of ammonium sulfide. The solution is now evaporated in vacuo, the residual syrup is taken up with water and neutralized with bicarbonate of soda, and an equeous solution of 4.6 grams potassium bromide is added. An oil separates out which solidifies on being triturated and which, on being recrystallized from chloroform, has a melting point of about 110–111° C. The compound thus obtained is the α-hydroxy-β-methoxy-γ-mercuric bromide-γ-phenyl propane.

In the same manner the α-hydroxy-β-ethoxy-γ-mercuric chloride-γ-phenyl propane can be obtained, if ethyl alcohol is used as a solvent and sodium chloride as a precipitant. This compound melts at about 86°, dissolves with difficulty in petroleum ether and is easily soluble in methyl and ethyl alcohol, ethyl acetate and hot benzene.

If the mercury bromide compound is heated with one molecule iodine in an ethyl acetate solution, the iodine is decolourized after two minutes. After removing the mercury salt and removing the solvent by distillation, there remains the α-hydroxy-β-methoxy-γ-iodine-γ-phenyl propane forming a colourless syrup which does not distil over even in a high vacuum, but deflagrates at about 120° under separation of iodine. This compound is insoluble in water and dissolves readily in ethyl acetate, chloroform and ether.

If heated with 3 molecules diethyl amine to 100°, there takes place within one hour the exchange of the halogen for the amine. After treating as usual, there is produced a slightly coloured oil dissolving in water only with difficulty and boiling partly at 123–125° in a high vacuum.

B. The etherification of the amino propanes etherified in β-position is obtained for instance as follows:—

Example 8.

α-hydroxy-β-methoxy-γ-diethylamino propane is dissolved in an equal quantity by weight of benzene and a solution of 1.5 molecules p-nitro benzoyl chloride in the fivefold quantity of benzene is added. The oil which precipitates at once, solidifies after a short time, forming a crystalline mass which is the hydrochloride of the nitro benzoate

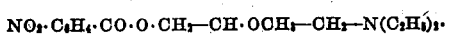

If this compound is recrystallized from a large quantity of benzene or amyl alcohol, there results the hydrochloride of α-(p-nitro benzoyl)-β-methoxy-γ-diethyl amino propane forming fine long pointed needles melting at about 143–144° C.

The nitro compound can be converted into the amino compound by dissolving it in concentrated hydrochloric acid and reducing with the calculated quantity of stannous chloride, care being taken to prevent the temperature from rising above 45°. After neutralizing the hydrochloric acid with caustic alkali and rendering alkaline with potassium carbonate there is obtained by extraction with ether the α-(p-amino benzoyl)-β-methoxy-γ-diethyl amino propane.

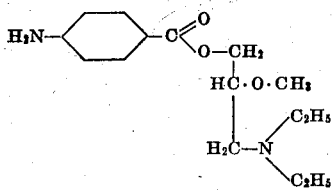

forming a thick colourless oil insoluble in water and soluble in organic solvents. The hydrochloride forms minute needles having the melting point 159° (not corrected); it is readily soluble in water with neutral reaction and acts as a vigorous anesthetic.

*Example 9.*

By starting from α-hydroxy-β-ethoxy-γ-diethylamino propane and proceeding as described with reference to Example 8, there is obtained α-(p-nitro benzoyl)-β-ethoxy-γ-diethyl amino propane and by reduction the corresponding amino compound

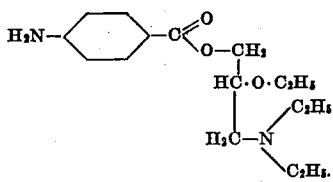

The hydrochloride of the nitro benzoyl compound is a crystal powder consisting of slightly yellow needles readily soluble in water and melting at about 152°. The hydrochloride of the amino benzoyl compound which also melts at about 152° is a colourless crystal powder readily soluble in water and alcohol. It acts as an anesthetic in a similar manner as the correspondingly methoxy compound.

*Example 10.*

The α-hydroxy-β-methoxy-γ-piperidino-propane if treated in the manner above described is converted into α-(p-nitro benzoyl)-β-methoxy-γ-piperidino propane, the hydrochloride of which crystallizes from ethyl acetate in large pointed crystals melting at about 163–164° and readily dissolving in water and alcohol, while only with difficulty in ethyl acetate.

The hydrochloride of α-amino benzoyl-β-methoxy-γ-piperidino propane

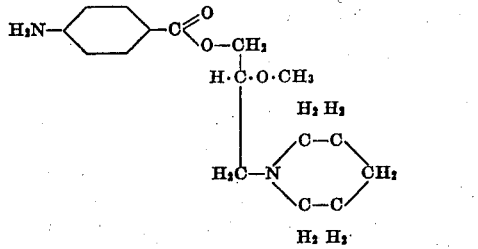

which also acts as an anesthetic melts at about 169–170° and is easily soluble in water, but dissolves only with difficulty in ethyl acetate and acetone.

*Example 11.*

α-hydroxy-β-methoxy-γ-trimethyl ammonium iodide propane is converted into its acetyl derivative by short boiling with acetyl chloride in excess or still more conveniently by dissolving in pyridine and adding 1.2 molecules acetic acid anhydride. The α-aceto-β-methoxy-γ-trimethyl ammonium iodide propane

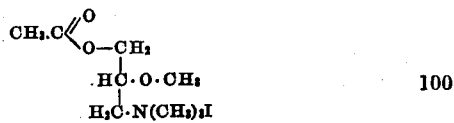

crystallizes at once in pure form from the mixture of pyridine and acetic acid anhydride and forms large colourless crystals which melt at about 161–162° and are readily soluble in water, alcohol and dilute acids.

*Example 12.*

If molecular quantities of α-hydroxy-β-methoxy-γ-trimethyl ammonium iodide propane and meta phosphoric acid ethyl ester are allowed to stand at ordinary temperature during some days, the ethyl phosphoric acid ester

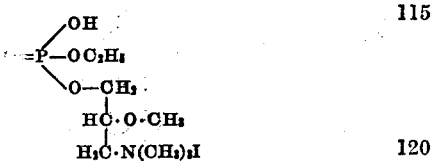

is formed. It is a thick slightly brownish syrup readily soluble in water from which results after neutralization with barium hydroxide an amorphous mono-barium salt which dissolves in water only with a certain difficulty.

*Example 13.*

By treating the α-hydroxy-β-methoxy-γ-trimethyl ammonium iodide propane under vigorous cooling with chlorine sulfonic acid in excess there is obtained under generation of hydrochloric acid the acid sulfate ester of this compound

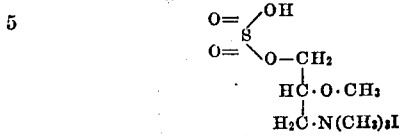

in the form of a thick syrup which is capable of forming salts and readily soluble in water.

The esters of α-hydroxy-β-methoxy-γ-trimethyl ammonium iodide propane above mentioned have the property of causing peristaltic movements of the intestines.

We wish it to be understood that we do not desire to be limited to the exact sequence of operations, quantities, proportions and other conditions of working above described, for obvious modifications will occur to a person skilled in the art.

We claim:—

1. As a new product an ester of an amino propane etherified in β-position which corresponds to the formula

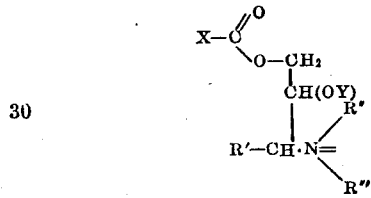

wherein X is either an alkyl or aryl or a product of substitution thereof, Y an alkyl, R' a hydrogen atom or alkyl or aryl, R'' a hydrogen atom or alkyl, R''' a hydrogen atom or alkyl and wherein R'' and R''' together can also be a cyclic radical, said product, on being heated with an alkali, splitting off its acyl radical and forming with acids and halogen alkyls colorless salts which are soluble in water and alcohol and have valuable therapeutical properties.

2. As a new product an α-amino benzoyl-β-alkoxy-γ-diethylamino propane corresponding to the formula

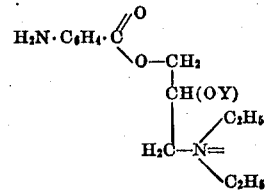

this product being a colourless compound insoluble in water, soluble in organic solvents, splitting off its acyl radical on being heated with an alkali, and forming with acids and halogen alkyls colourless salts which are soluble in water and alcohol and have valuable therapeutical properties.

In testimony whereof we affix our signatures.

WALTER SCHOELLER.
HERBERT SCHOTTE.